United States Patent [19]

St. Pierre

[11] Patent Number: 5,601,724
[45] Date of Patent: Feb. 11, 1997

[54] METHOD OF AERATION OF LIQUIDS

[75] Inventor: Denis J. St. Pierre, Stony Plain, Canada

[73] Assignee: Aquatex Group Industrie, S.A., Edmonton, Canada

[21] Appl. No.: 498,690

[22] Filed: Jul. 3, 1995

Related U.S. Application Data

[62] Division of Ser. No. 96,359, Jul. 23, 1993, Pat. No. 5,460,731.

[51] Int. Cl.$^6$ .............................. C02F 1/74; B01D 37/00; B01F 3/04
[52] U.S. Cl. ..................... 210/722; 210/758; 210/199; 210/220; 261/5; 261/76
[58] Field of Search ................ 261/5, 76, DIG. 75, 261/77; 210/220, 199, 722, 758

[56] References Cited

U.S. PATENT DOCUMENTS

| | | |
|---|---|---|
| 2,237,882 | 4/1941 | Lawlor et al. . |
| 2,890,838 | 6/1959 | Jannsen . |
| 3,265,370 | 8/1966 | Scholten . |
| 3,446,353 | 5/1969 | Davis . |
| 4,101,409 | 7/1978 | Austin . |
| 4,255,257 | 3/1981 | Greiner et al. . |
| 4,430,228 | 2/1984 | Paterson . |
| 4,490,248 | 12/1984 | Filippov et al. . |
| 4,534,867 | 8/1985 | Kreusch et al. . |
| 4,556,523 | 12/1985 | Lecoffre et al. . |
| 4,654,463 | 4/1987 | Chandler et al. . |
| 4,885,084 | 12/1989 | Doyle . |
| 4,966,692 | 10/1990 | Overy . |
| 5,096,580 | 3/1992 | Auchincloss . |
| 5,096,596 | 3/1992 | Hellenbrand et al. . |
| 5,147,530 | 9/1992 | Chandler et al. . |

FOREIGN PATENT DOCUMENTS

| | | |
|---|---|---|
| 1003728A3 | 6/1992 | Belgium . |
| 958322 | 11/1974 | Canada . |
| 2043162 | 12/1991 | Canada . |
| 2041888 | 11/1992 | Canada . |
| 1334822 | 3/1995 | Canada . |
| 1153725 | 1/1960 | Germany . |
| 2-203990 | 8/1990 | Japan . |
| 4-322790 | 11/1992 | Japan . |
| 9202810 | 4/1992 | Rep. of Korea . |
| 1690837 | 11/1991 | U.S.S.R. . |

*Primary Examiner*—Thomas M. Lithgow
*Attorney, Agent, or Firm*—Michael A. O'Neil

[57] ABSTRACT

A tower-like pressure vessel utilizes the injection of gas bubbles for aeration of liquids. A cylindrical conduit extends vertically in the interior of the vessel. The interior conduit has a first end connected to an inlet liquid flow conduit and a second end disposed immediately adjacent the top of the pressure vessel thereby forming a gap which serves as a flow restriction. An outlet for the vessel is located adjacent to the bottom of the vessel.

A gas injector located outside the pressure vessel injects gas into the inlet liquid flow conduit thereby forming a plurality of small gas bubbles that adhere to the walls of a portion of the inlet conduit having a bend. The small bubbles amalgamate to form larger bubbles substantially consistent in size prior to being swept by the liquid stream through the flow restriction at the top of the vessel. The gas bubbles pass more quickly through the restriction creating a pneumatic acceleration and hammering effect upon the top of a pressure vessel which serves as an impaction target. The liquid then cascades by force of gravity through the gas in the pressure vessel to further impact upon liquid accumulated in the pressure vessel.

9 Claims, 2 Drawing Sheets

5,601,724

METHOD OF AERATION OF LIQUIDS

This is a divisional application of U.S. application Ser. No. 08/096,359, filed Jul. 23, 1993, now U.S. Pat. No. 5,460,731.

TECHNICAL FIELD

The present invention relates to a method for aeration of liquids, and more specifically, to a method for aeration of liquids including the use of gas injections.

BACKGROUND OF THE INVENTION

Aeration of liquids is required in numerous industrial processes. For example, water treatment systems use oxygenation to remove iron, manganese and gases from water. Oxidization chemically transforms iron into ferric oxide (FeO), and triggers a further reaction with water to form the precipitate ferric hydroxide $2Fe(OH)3$. Additionally, oxidization of manganese forms manganese dioxide ($MnO2$), a catalyst used to oxidize iron and manganese into their respective oxides. These precipitates are then captured in a filter medium and removed from the water. The efficiency of water treatment systems are, therefore, dependent upon the amount of oxygen which the water is capable of absorbing.

Traditionally, four approaches have been employed to increase the absorption capacity of a liquid. One approach is known as the "gravity" method. Under this method droplets of liquid are allowed to fall through air. Another approach is "mechanical" aeration. With this method gas is introduced and the liquid is violently agitated. A different approach is the "spray" method. According to this method liquid is forced through a nozzle and sprayed through the air. Finally, a "diffuser" approach can be employed.

While all of the foregoing methods attempt to decrease the interfacial films between the liquid and gas molecules, the level of aeration achieved is inefficient. Thus a need has arisen for a method of aeration in which a greater efficiency of aeration is achieved.

SUMMARY OF THE INVENTION

The present invention overcomes the foregoing and other problems associated with the prior art methods by providing a method of aeration including the injection of gas bubbles.

Although beneficial results may be obtained through the use of the described method, even more beneficial results may be obtained if the bubbles are substantially the same size as the restriction.

Although beneficial results may be obtained through the use of the described method, it is preferred that there be a spacial separation between the bubbles as they go through the restriction. Even more beneficial results may therefore be obtained if the liquid stream is directed downwardly through a vertically aligned conduit prior to flowing through the restriction, such that a spacial separation of the bubbles occurs.

Although beneficial results may be obtained through the use of the described method, by controlling the atmospheric pressure the absorption capacity of the liquid can be increased. Even more beneficial results may therefore be obtained if the restriction is housed in a pressure vessel.

Although the beneficial results may be obtained through the use of the described method, if the difference in density between the gas and the liquid can be used to enhance acceleration. Even more beneficial results may therefore be obtained if the impaction target is at the top of the pressure vessel such that the buoyancy of the air bubbles results in an acceleration of the liquid stream prior to impacting upon the target.

Although beneficial results may be obtained through the use of the described method, it is preferred that aeration methods be combined to create a synergistic mixing effect. Even more beneficial results may therefore be obtained if the pressure vessel is a tower such that the liquid stream strikes the impaction target and then by force of gravity cascades through the gas in the pressure vessel to further impact upon liquid accumulated in the pressure vessel.

BRIEF DESCRIPTION OF THE DRAWINGS

These and other features of the invention will become more apparent from the following description in which reference is made to the appended drawings, wherein.

DETAILED DESCRIPTION OF THE DRAWINGS

Referring to FIGS. 1 through 4, the apparatus are components of a water treatment system developed for intermixing oxygen with water, but the method described is equally applicable to the intermixing of other gases with other liquids.

Figure 1:
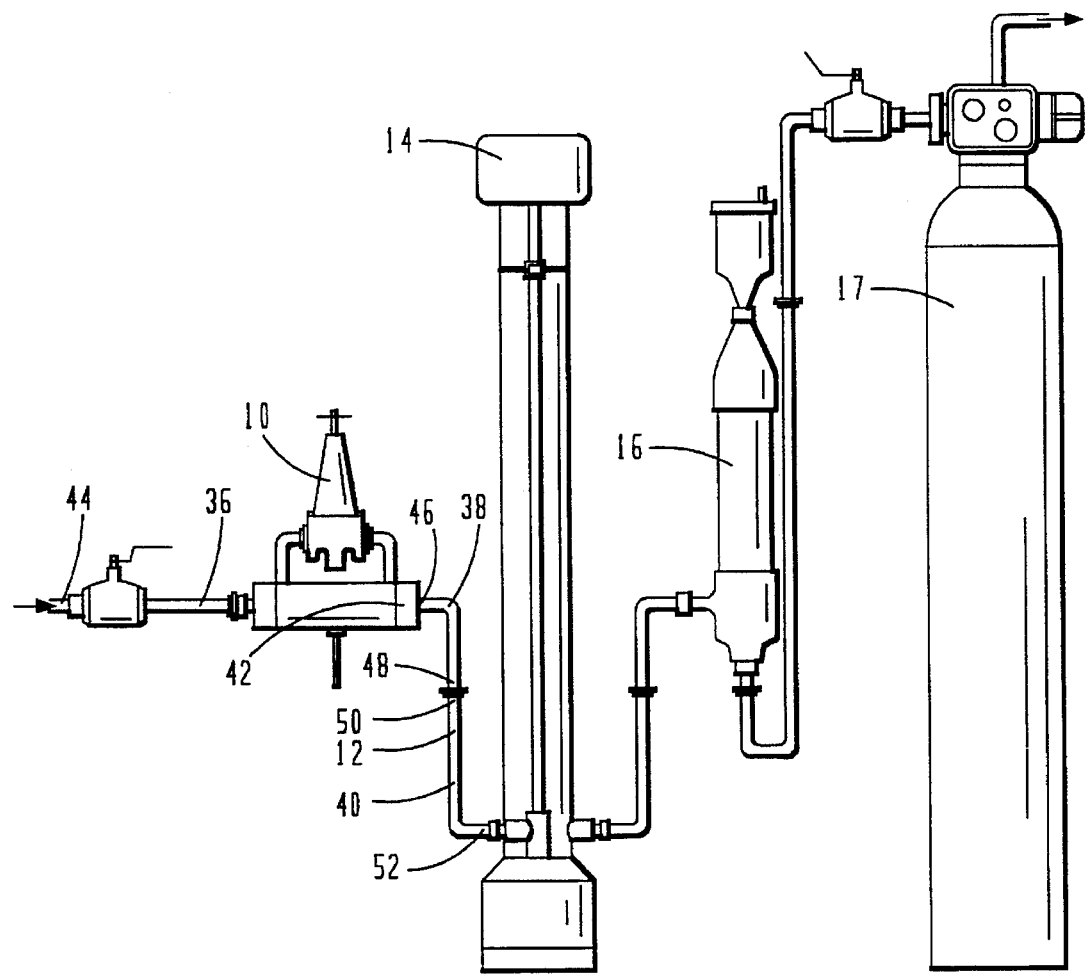
FIG. 1 is a perspective view of a water treatment system constructed in accordance with the teachings of one embodiment of the present method.
Figures 2, 3, 4:
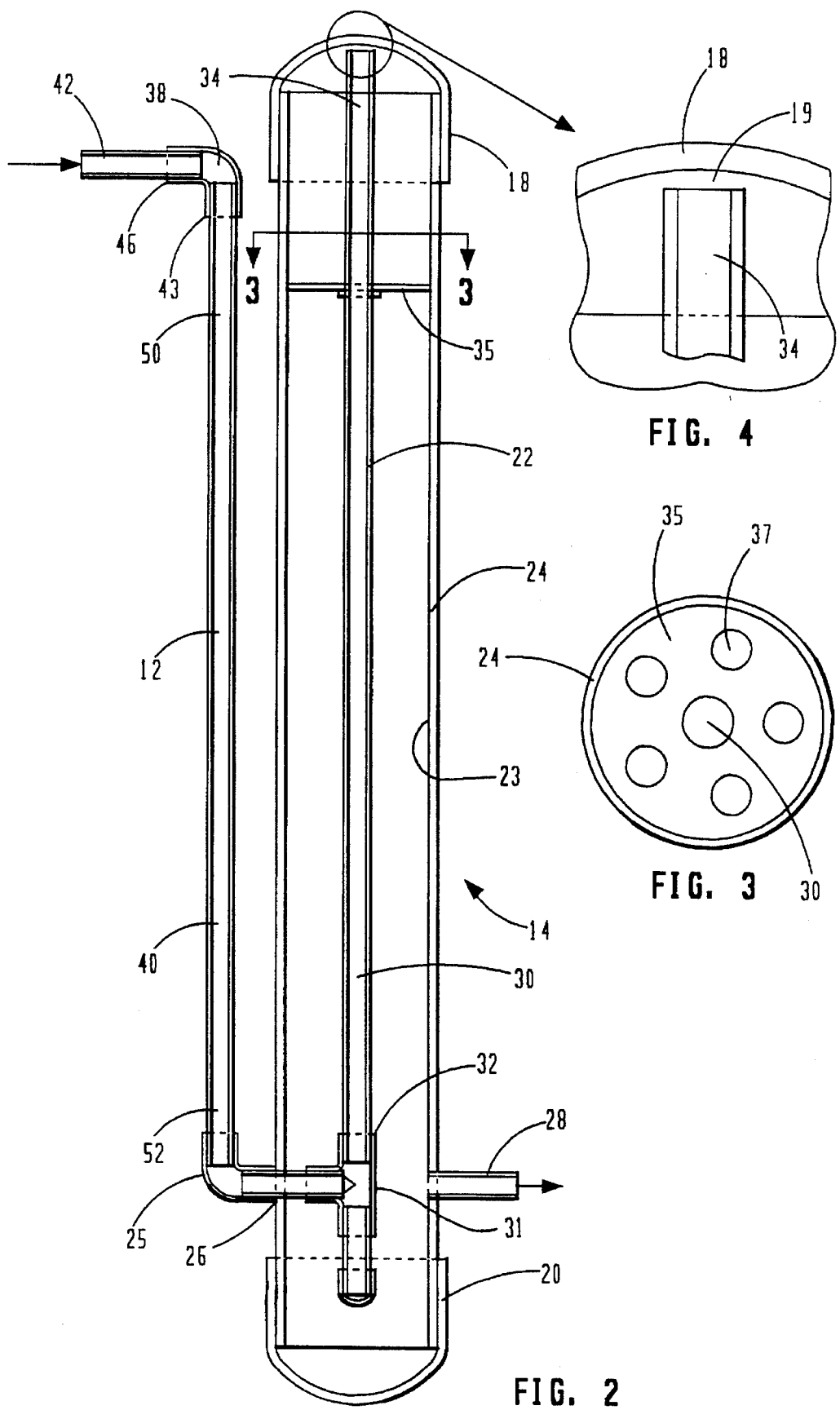
FIG. 2 is a longitudinal section view of an apparatus for the aeration of liquids taken along section lines 2—2 of FIG. 1.
FIG. 3 is a section view taken along section lines 3—3 of FIG. 1.
FIG. 4 is a detailed view of a portion of FIG. 2.

Referring to FIG. 1, the components of the water treatment system consist of a venturi air injector 10, a fluid conduit 12, a tower-like pressure vessel 14, a gas eliminator 16, and a filter 17. Although the described components are well suited for use in accordance with the preferred method which will hereinafter be described, it must be recognized that other configurations could be adapted for use in accordance with the teachings of the preferred method. Referring to FIG. 2, pressure vessel 14 has a top 18, a bottom 20, an interior cavity interior walls 23 and an exterior 24. Liquids have access to interior cavity 22 through an inlet 26 and egress from interior cavity 22 through an outlet 28. Both inlet 26 and outlet 28 are positioned adjacent bottom 20. A cylindrical conduit 30 extends substantially vertically in interior cavity 22. Conduit 30 has a first end 32 coupled by a "T" joint 31 with inlet 26 and a second end 34 disposed immediately adjacent top 18 forming a cylindrical flow restriction gap 19. Referring to FIG. 3, a plate 35 with a plurality of openings 37 is spaced from top 18 of pressure vessel 14. Referring to FIG. 1, liquid flow conduit 12 has a substantially horizontal portion 36, a portion with a bend 38, and a substantially vertical portion 40. Horizontal portion 36 has a first end 42 and a second end 44. Portion with a bend 38 has a first end 46 and a second end 48. Vertical portion 40 has a first end 50 and a second end 52. First end 42 of connecting portion 36 is secured to first end 46 of portion with a bend 38. Second end 48 of connecting portion 36 is adapted for connection to a source of liquids under pressure (not shown). First end 50 of vertical portion 40 is connected to second end 48 of portion with a bend 38 at a height of approximately ⅔ of the height of pressure vessel 14. Second end 52 of vertical portion 40 is connected by an 90 degree elbow 25 to inlet 26 of pressure vessel 14. Gas injector 10 is secured to horizontal portion 36 of liquid flow conduit 12.

In its most fundamental form the method consists of only two steps. Firstly, injecting a gas into a flowing liquid stream to form a plurality of gas bubbles in the flow stream. Secondly, directing the liquid stream through a restriction gap whereby the gas bubbles pass more quickly through the restriction pneumatically accelerating the liquid. In the preferred method those fundamental steps have been combined with additional steps which through experimentation it has been found enhance the desired aeration. In addition some conventional gravity, spray and mechanical aeration techniques have been incorporated in the preferred method. The intermixing takes place in a pressure vessel to further increase the absorption capacity of the liquid. The preferred method, therefore, consists of the following described steps.

Firstly, a gas is injected via gas injector 10 into a flowing liquid stream in the horizontal portion 36 of liquid flow conduit 12 to form a plurality of gas bubbles (not shown). This is illustrated in FIG. 1. In the illustrated application air is being injected into water: however, with other applications care must be taken to ensure the liquid is not so viscous so as to prevent the desired pneumatic acceleration from occurring.

Secondly, the liquid stream is directed through the portion with a bend 38 of liquid flow conduit 12. During this step, small gas bubbles adhere to the wall of portion with a bend 38 and amalgamate to form pockets of larger bubbles of substantially consistent size prior to being swept away by the liquid stream. The size of the bubbles can enhance the desired pneumatic acceleration, as will be hereinafter explained. The bend in portion 38 is illustrated as being at 90 degrees, but it has been determined that a much less severe bend will also be operable. The less severe bend produced smaller bubbles.

Thirdly, the liquid stream is directed downwardly through the vertical portion 40 of liquid flow conduit 12. The air bubbles have a tendency to rise in vertical portion 40. This tendency keeps the air bubbles accumulating in the portion with a bend 38 extending the opportunity for the air bubbles to amalgamate prior to clusters of bubbles being swept down the vertical portion 40 by the liquid stream. As the bubbles descend down the vertical portion 40 they become evenly spaced. The height of the vertical portion 40 must be sufficient to achieve the desired spacing. A rule of thumb developed by the Applicant is that the height of the vertical portion 40 should be approximately ⅔ of the height of pressure vessel 14. This step will be hereinafter further explained in relation to the studies made on the prototype.

Fourthly, the liquid stream directed through a cylindrical restriction gap 19 formed between the second end 34 of conduit 30 and the top 18 of pressure vessel 14. The gas, being of lesser density, passes more quickly through the restriction. This pneumatically accelerates the liquid in front of the bubbles, as the bubbles "push" the liquid through the restriction. Liquid following the bubbles also accelerates due to a decrease in resisting pressure. As the liquid exits the restriction gap 19 it pneumatically hammers against the top 18 of the pressure vessel 14 which serves as an impaction target. The size of the restriction gap 19 required is dependent upon the size of bubbles that are produced. The variables on bubble size and the flow of the bubbles through restriction gap 19 will be hereinafter explained in relation to the studies made on the prototype.

The liquid stream then by force of gravity cascades through the gas in the pressure vessel 14 to further impact upon the plate 35. The liquid stream then passes through the openings 37 in the plate 35 and by force of gravity cascades through the gas in the pressure vessel 14 to further impact upon the bottom 20 of the pressure vessel 14. As the pressure vessel 14 continues to be used liquid accumulates at the bottom 20 of the pressure vessel 14, it is primarily upon this liquid that the liquid stream impacts. Outlet 28 provides a means for removing liquid from the interior cavity 22 of the pressure vessel 14, but the interior cavity 22 is always partially filled during use. In this particular water treatment application the liquid stream continues on from the outlet 28 to the gas eliminator 16, where gases are vented, and then on to the filter 17 where the precipitates ferric hydroxide $Fe(OH)_3$ and manganese dioxide ($MnO_2$) are removed.

The presence of the plate 35 serves a dual purpose. It not only provides an impaction surface as described, but also serves to prevent a portion of the liquid stream from running down the side walls 23 of the interior cavity 22, and avoiding the desired intermixing. The pressure level in the pressure vessel 14 is maintained at 3 atmosphere. As a general rule the greater the atmospheric pressure the greater the ability of the liquid to absorb the gas and, this case, the water to absorb the oxygen. The effect of a variation in the size of the restriction between the second end 34 of the conduit 30 and the top 18 of the pressure vessel 14 must be noted. If the distance is too large the impaction is diminished.

If the distance is too small, although there is good impaction, you lose your flow rate, open the possibility of clogging, and create two great of a pressure loss across the restriction. It will be noted that there are multiple impaction points in the described apparatus. The more of these impaction points the thinner the interfacial films between the water and the air; the thinner the interfacial films the faster the transfer of oxygen. When passing the liquid stream through the described apparatus the water should be cooled as heat tends to degas water and prevent the desired intermixing. The velocity of the liquid flow stream as it passes through the apparatus is approximately 9 feet per second. If the flow is too slow, it diminishes the force of the impact upon the top 18. If the flow is too fast it creates flow problems with a consequential pressure loss and adversely effects bubble formation. The applicant recommends adding to the water treatment system illustrated a regenerating catalyst in the filter 17, to further enhance the oxidation process. The applicant also recommends adding to the water treatment system illustrated a fluid stabilizing unit after filter 17, in order to thoroughly intermix the constituent elements and prevent calcium scale build-up on equipment downstream.

The Applicant built a test apparatus out of transparent material in order that the method could be studied and photographed. The flow in the substantially horizontal portion 36 of the conduit 12 was studied to determine the effect of the alteration of the distance between the air injector 10 and the bend 38 and other variables. The Applicant discovered that air injected by the air injector 10 formed bubbles of relatively small random sizes. The injection rate at which these bubbles would amalgamate into larger bubbles in the flow stream and the size of the bubbles formed was dependent upon the size and length of the conduit 12, and flow rate of liquid within the horizontal portion 36.

Also of importance was the air to fluid ratio. As more air was injected into the flow stream, there was an increase in the rate at which the smaller bubbles amalgamated and the size of the bubbles formed. As the distance from the air injector 10 to the bend 38 was increased the bubbles became larger due to increased time for the amalgamation. The flow rate effected the amalgamation rate as the slower the bubbles travelled along horizontal portion 36 the more time they had to amalgamate. As the speed of the flow stream was increased, the turbulence in the horizontal portion 36 similarly increased. The turbulence tended to rip the larger bubbles apart forming smaller bubbles and prevent the smaller bubbles from re-amalgamating. Regardless of which variable was altered the bubbles remained of random size.

In studying the flow around the bend 38 it was determined that the smaller the radius of the bend 38 the more mixing of the air and the fluid occurred. This was not, however, the primary purpose of the bend 38. Bend 38 serves to collect most incoming bubbles into pockets located at the top of the bend 38. It is significant that the bubbles which make up the pockets are of a relatively consistent size and are large compared to the starting injected bubbles. The size of the pockets will vary largely dependent on the velocity of the fluid flow stream. These pockets are continuously generated and as the pockets of bubbles increase in size they impinge on the flow stream. The impingement eventually becomes so great that the flow stream separates and entrains a portion of the pockets of air bubbles. The pocket will then again increase its size to the point where another portion of the pocket will be separated and entrained. There is a consistent pattern to this building and separating of a portion of the pocket. The faster the velocity of the flow stream the smaller the bubbles formed in the pockets will be. There is, however, a limiting factor in that there has to be enough air injected in the flow stream to accommodate pocket formation. If the air to fluid ratio is too low, the bubbles will have a tendency to stay entrained in the flowing stream.

In order for the entrained pockets of gas to be swept down vertical portion 40, the velocity of the fluid has to be greater than the buoyancy forces attempting to force the bubble in the opposite direction. As a bubble flows down vertical the portion 40, a flattening of the bubble occurs. This causes a mixing and a transfer of gases from the water to the air and vice versa. The bubbles also separate and space themselves evenly as they flow downwardly. The length of the vertical portion 40 should be long enough to accommodate this bubble separation. Vertical portion 40 of the Applicant's prototype was 32 inches with a pipe having a 0.8 inch inside diameter. The velocity of the flow stream was maintained at 9 feet per second. As the Applicant increased the length of vertical portion 40, the contact time with the water was increased but the desired bubble separation was not substantially effected. As the Applicant shortened the vertical portion 40 the bubble separation diminished. The diminishing of the bubble separation was viewed as being undesirable, as this allowed for amalgamation of the bubbles into larger bubbles. Amalgamation is undesirable for reasons which will be hereinafter explained.

When flowing through the 90 degree elbow 25 and the "T" joint 31, the bubbles generally did not amalgamate into larger bubbles. This was attributed to the separation between the bubbles, elbow 25 caused turbulence which increased oxygen transfer. The smaller the radius of the elbow the greater the turbulence. When a tee was substituted for elbow 25 for this redirection and turbulence function, the bubbles tended to amalgamate and separate into more random sizes. The velocity of the water as it flowed through elbows 25 and 31 proved to be important. Slower moving water permitted the bubbles to amalgamate and faster flowing water broke up the bubbles prematurely. "T" joint 31 caused turbulence in the fluid, much the same as the elbow 25. However, more turbulence was created, due to the apparent short radius as compared to a typical elbow of the same size. This increased the oxygen transfer rate. The use of "T" joint 31 to redirect the fluid flow from horizontal to an upward flow did not have negative effects, unlike the substitution of a "T" joint for the elbow 25.

As the bubbles flowed up the conduit 30 they assumed a more spherical shape and raced toward the restriction and impaction target. The velocity of the bubbles was greater than that of the flowing water due to buoyancy.

As the bubbles reached the top 18 of the pressure vessel 14, they impacted upon the top 18 with the water causing a localized high pressure zone. This zone crushed the bubble to a smaller size. Additional an increase in bubble pressure and oxygen transfer rate was noted. The greater the speed of the water the greater the crushing effect. These bubbles were then swept way by following water causing the bubble to expand to its approximate original size. Some bubbles broke up due to this violent action. This is not viewed by the Applicant as being a desirable effect for reasons which will be hereinafter explained, however, it does cause considerable gas transfer. The contracting and expanding of the bubble causes a thinning of interfacial films on both the water and gas side.

The impacted bubbles and nonimpacted bubbles then travel over to the restriction gap 19. Here the bubbles will begin to flow through the restriction gap 19 in various areas. The water in front of the bubble is pushed forward at increased velocity by the following gas, because of the ability of the gas to travel faster through the restriction gap 19. This water sprays against the interior walls 23 of the interior cavity 22 of the pressure vessel 14 causing intimate mixing with the gas contained in the pressure vessel 14. The fluid following the bubble also increases in velocity due a decrease in pressure caused by the faster travelling bubble. When the water reaches the restriction gap 19 it then rapidly reduces its velocity and causes a localized high pressure zone. Any bubbles in the immediate vicinity are compressed, and subsequently expand. The increased local pressure will cause spraying of water into the bubble travelling restriction gap 19. All the turbulence caused by the compressing and expanding increase turbulence. This will then equate to more gas and liquid transfer. The restriction gap 19 used by the Applicant had a cylindrical peripheral edge. This cylindrical edge was preferred as the liquid sprayed in all directions. The greater the diameter of the cylindrical peripheral edge the more area which was provided for spraying. However, the greater the diameter, the closer the end 34 of the conduit 30 had to be positioned to the top 18 of the pressure vessel 14. The relationship between the restriction gap 19 and bubble size is important. In order to maintain this relationship it is required that the bubbles be of uniform size. The use of the bend 38 to form bubbles into pockets is critical to the formation of bubbles of uniform size. The bubbles should be large enough so that they occupy the height of the restriction gap 19. This is so that the restriction force is at a minimum, causing greater velocity changes in the liquid before and after the gap. The bubbles should also be numerous so that the effect can be spread around the cylindrical peripheral edge of restriction gap 19. This will have the effect of creating numerous violent small jets of spray around restriction gap 19.

The water leaving the restriction gap 19 impinges on the interior walls 23 and cascade down to the baffle plate 35. Water striking the baffle plate 35 streams through the openings 37 the striking surface of water in vessel 14. The faster the water impinges on the water surface the more the gases can transfer to and from the liquid. Also the faster the water impinges on the surface of the fluid in the vessel the higher the fluid level will become. This is due to the formation of very small bubbles which have very little buoyant forces acting upon them. This allows them to be swept away out of the drain of the vessel, thus removing vessel gas. Having the vessel under pressure also helps in oxygen transfer. This is due to an increase in partial pressure of the gases in the vessel and bubbles.

It will be apparent to one skilled in the art that modifications may be made to the preferred method and to the preferred apparatus without departing from the spirit and scope of the invention. In particular, it is beneficial but not essential that the method and apparatus include the preferred means for enhancing the size of the gas bubbles. Further, it is beneficial but not essential that the method and apparatus also include other types of gravity and mechanical aeration techniques.

We claim:

1. An apparatus for aeration of liquids comprising:

a tower-like pressure vessel having a top, a bottom, an interior, an exterior, an inlet and an outlet, the inlet and the outlet to the vessel being adjacent to the bottom of the vessel; the inlet connected to an external source of a mixture of gas bubbles and liquid; and the pressure vessel having a cylindrical conduit in the interior oriented substantially vertically, the interior conduit having a first end connected to the inlet of the pressure vessel and extending continuously to a second end disposed immediately adjacent to the top of the pressure vessel thereby forming a gap which serves as a flow restriction causing gas bubbles to pass upward more quickly through the restriction and pneumatically accelerate the liquid said gap being of sufficient size so as to cause the gas bubbles and liquid to spray through the gap.

2. The apparatus for aeration as in claim 1 wherein the flow restriction is a gap with a generally cylindrical peripheral edge.

3. The apparatus for aeration of claim 1 wherein the top of the pressure vessel serves as an impaction target.

4. An apparatus for aeration of liquids comprising:

a tower-like pressure vessel having a top, a bottom, an interior, an exterior, an inlet and an outlet, the inlet and the outlet to the vessel being adjacent to the bottom of the vessel, the inlet connected to an external source of a mixture of gas bubbles and liquid; and the pressure vessel having a cylindrical conduit in the interior which extends substantially vertically, the interior conduit having a first end connected to the inlet of the pressure vessel and a second end disposed immediately adjacent to the top of the pressure vessel, thereby forming a gap which serves as a flow restriction of substantially the same size as the bubbles, causing the gas bubbles to pass upward more quickly through the restriction and pneumatically accelerate the liquid.

5. An apparatus for aeration of liquids comprising:

a tower-like pressure vessel having a top, a bottom, an interior, an exterior, an inlet and an outlet, the inlet and the outlet to the vessel being adjacent to the bottom of the vessel, the inlet connected to an external source of a mixture of gas bubbles and liquid;

the pressure vessel having a cylindrical conduit in the interior which extends substantially vertically, the interior conduit having a first end connected to the inlet of the pressure vessel and a second end disposed immediately adjacent to the top of the pressure vessel thereby forming a gap which serves as a flow restriction causing gas bubbles to pass upward more quickly through the restriction and pneumatically accelerate the liquid; and a circular plate located a predetermined vertical distance from the top of the pressure vessel and in the annular space between the interior of the pressure vessel and the cylindrical conduit, said circular plate having a plurality of openings.

6. An apparatus for aeration of liquids, comprising:

a tower-like pressure vessel having a top, a bottom, an interior, an exterior, an inlet and an outlet, the inlet and the outlet to the vessel being adjacent to the bottom of the vessel having a cylindrical conduit in the interior which extends substantially vertically, the interior conduit having a first end connected to the inlet of the pressure vessel and a second end disposed immediately adjacent the top of the pressure vessel thereby forming a gap which serves as a flow restriction;

an inlet liquid flow conduit having a substantially horizontal portion having a first end and a second end, a portion with a bend having a first end and a second end, a substantially vertical portion having a first end and a second end, the second end of the horizontal portion being secured to the first end of the portion having a bend, the first end of a horizontal portion being adapted for connection to a source of liquids under pressure, the first end of the vertical portion being connected to the second end of the portion with a bend at a height approximately ⅔ of the height of the pressure vessel and the second end of the vertical portion being connected to an elbow that is connected to the inlet of the pressure vessel; and a gas injector being secured to the horizontal portion whereby gas may be injected into the liquid flow conduit thereby forming a plurality of gas bubbles, such that small gas bubbles adhere to the walls of the portion of the conduit having a bend and amalgamate to form larger bubbles substantially consistent in size prior to being swept by the liquid stream through the restriction, the gas bubbles passing more quickly through the restriction creating a pneumatic acceleration and hammering effect upon the top of a pressure vessel which serves as an impaction target, the liquid then cascading by force of gravity through the gas in the pressure vessel to further impact upon liquid accumulated in the pressure vessel.

7. The apparatus for aeration as in claim 6 wherein the flow restriction is substantially the same size as the bubbles.

8. The apparatus for aeration as in claim 6 wherein the flow restriction is a gap with a generally cylindrical peripheral edge.

9. The apparatus for aeration of claim 6 further including a circular plate located a predetermined vertical distance from the top of the pressure vessel and in the annular space between the interior of the pressure vessel and the cylindrical conduit, said circular plate having a plurality of openings.

* * * * *

UNITED STATES PATENT AND TRADEMARK OFFICE
CERTIFICATE OF CORRECTION

PATENT NO. : 5,601,724
DATED : February 11, 1997
INVENTOR(S) : Denis J. St. Pierre It is certified that error appears in the above-indentified patent and that said Letters Patent is hereby corrected as shown below:

Column 2, line 46
    Insert: --interior cavity 22,-- at beginning of line

Column 3, line 22
    Replace: -- : --
    With: -- ; --

Column 5, line 32
    Insert: --the-- before the word vertical

Column 5, line 34
    Insert: --the-- before the word vertical
    Delete: --the-- after the word vertical Column 5, line 40
    Insert: --The-- before the word vertical
    Replace: --Vertical--
    With: --vertical--

Column 5, line 55
    Replace: -- , -- after the word bubbles
    With: -- . --
    Insert: --The-- before the word elbow

UNITED STATES PATENT AND TRADEMARK OFFICE
CERTIFICATE OF CORRECTION

PATENT NO. : 5,601,724
DATED : February 11, 1997
INVENTOR(S) : Denis J. St. Pierre It is certified that error appears in the above-indentified patent and that said Letters Patent is hereby corrected as shown below:

Column 6, line 63
        Delete:    --the-- after the number "37"
        Insert:    --the-- after the word "striking"

Signed and Sealed this

Seventeenth Day of June, 1997

*Attest:*

BRUCE LEHMAN

*Attesting Officer*      *Commissioner of Patents and Trademarks*